United States Patent [19]

Foster et al.

[11] Patent Number: 5,564,506
[45] Date of Patent: Oct. 15, 1996

[54] ROCK RAKING APPARATUS

[75] Inventors: Phillip W. Foster; Gerald T. Foster; Paul Burton, all of Lee; John J. Broz, Hinckley, all of Ill.

[73] Assignee: Farmers' Factory Company, Rockford, Ill.

[21] Appl. No.: 387,305

[22] Filed: Feb. 27, 1995

[51] Int. Cl.⁶ ............................ A01B 43/00; A01D 19/02
[52] U.S. Cl. ................................................. 171/63; 172/554
[58] Field of Search ........................... 171/63; 172/554; 56/328.1, 344, 345, 351, 358, 359; 15/82, 83, 84, 85

[56] References Cited

U.S. PATENT DOCUMENTS

| 2,804,156 | 8/1957 | Greaves | 171/63 X |
| 3,637,024 | 1/1972 | Baskett | 171/63 |
| 3,746,099 | 7/1973 | Black | 56/328.1 X |
| 3,923,101 | 12/1975 | Donahue | 171/63 |
| 4,113,023 | 9/1978 | Baskett | 171/63 |
| 4,364,434 | 12/1982 | Erholm | 171/63 |
| 4,593,426 | 6/1986 | Chrisley | 171/63 |
| 4,608,725 | 9/1986 | Jackson | 56/328.1 X |
| 4,723,607 | 2/1988 | Hansen | 172/554 X |
| 5,060,732 | 10/1991 | Baskett | 171/63 |
| 5,329,661 | 7/1994 | Smith | 171/63 |

FOREIGN PATENT DOCUMENTS

| 2687533 | 8/1993 | France | 171/63 |
| 456591 | 3/1975 | U.S.S.R. | 171/63 |
| 1752248 | 8/1992 | U.S.S.R. | 171/63 |

Primary Examiner—Terry Lee Melius
Assistant Examiner—Christopher J. Novosad
Attorney, Agent, or Firm—Leydig, Voit & Mayer Ltd.

[57] ABSTRACT

The apparatus is adapted to be attached to a self-propelled vehicle and includes a rock raking unit with a toothed rotor and a rock collector bucket connected to one end of the raking unit by double articulated pivot bars to swing between open and closed positions relative to the raking unit. Rocks are raked into the bucket during rotation of the rotor in one direction and, by reversing the rotor when the apparatus is raised to a dump position, the raking unit may be pivoted to an open position relative to the bucket. The apparatus includes an easy-to-fabricate rotor, a power-rotated brush for clearing rocks from the rotor, and a bucket with a perforated bottom.

16 Claims, 6 Drawing Sheets

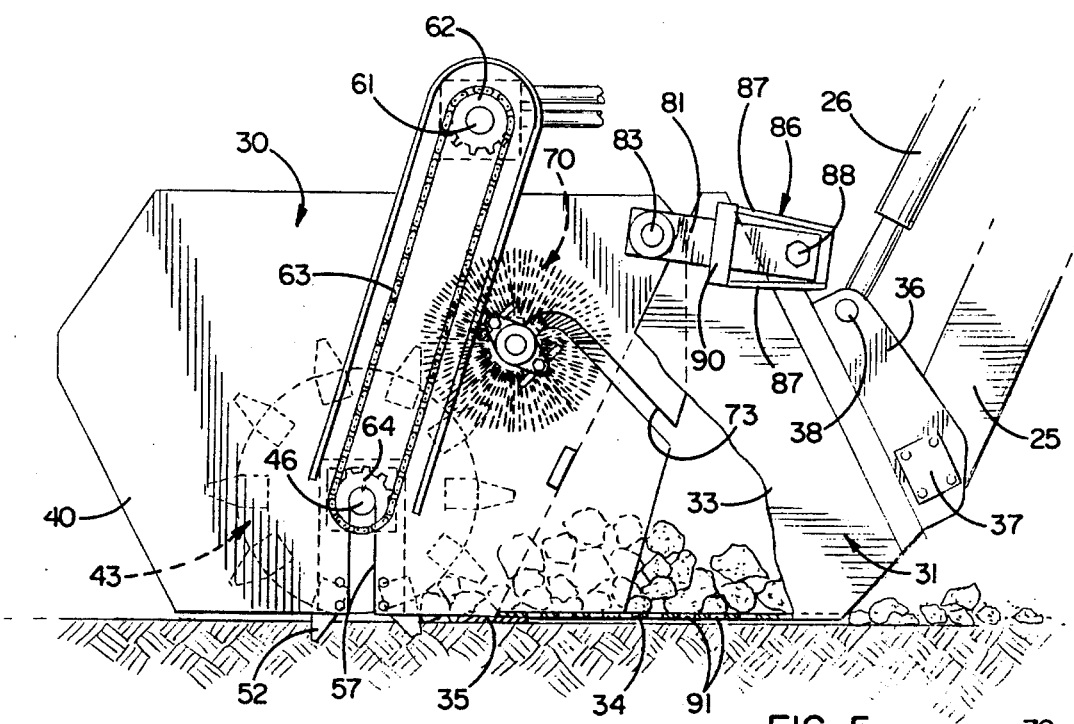
FIG. 5
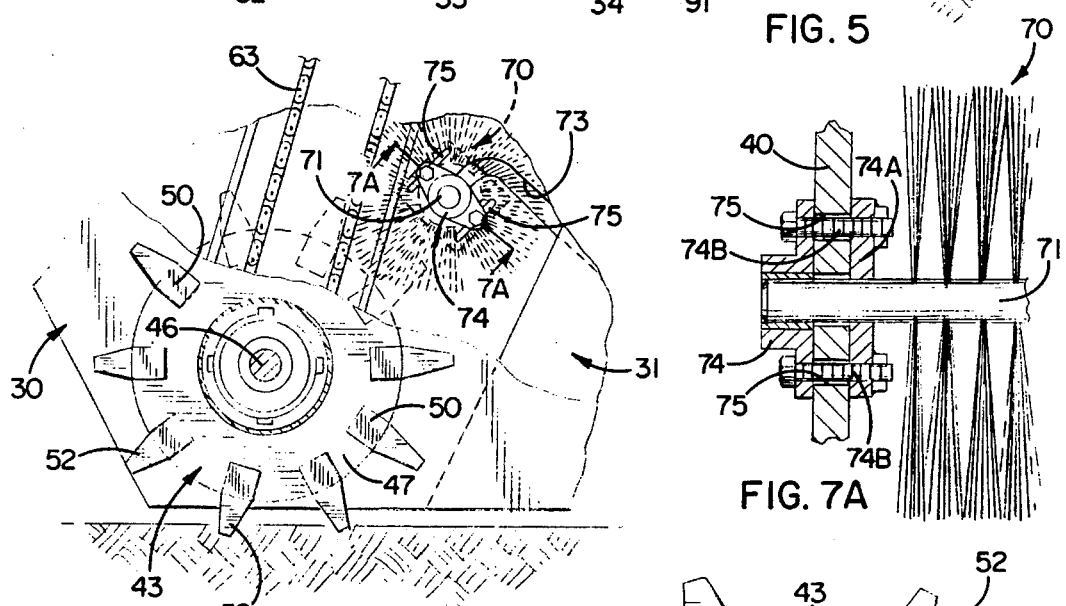
FIG. 7
FIG. 7A
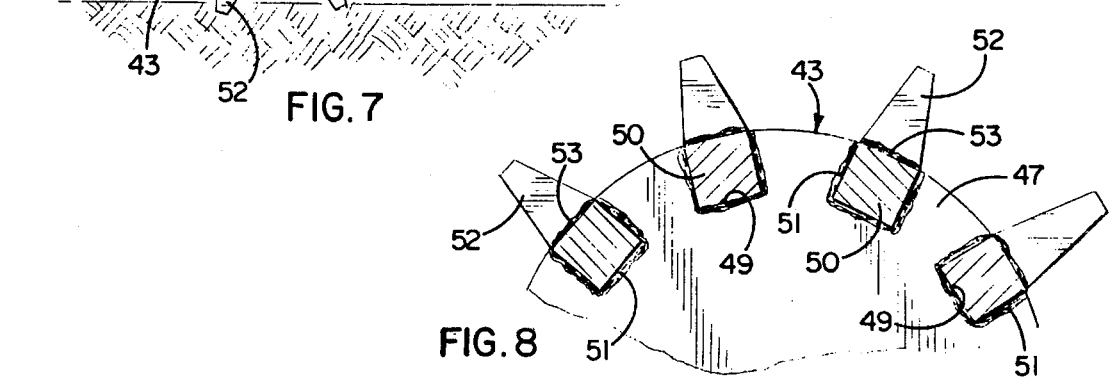
FIG. 8

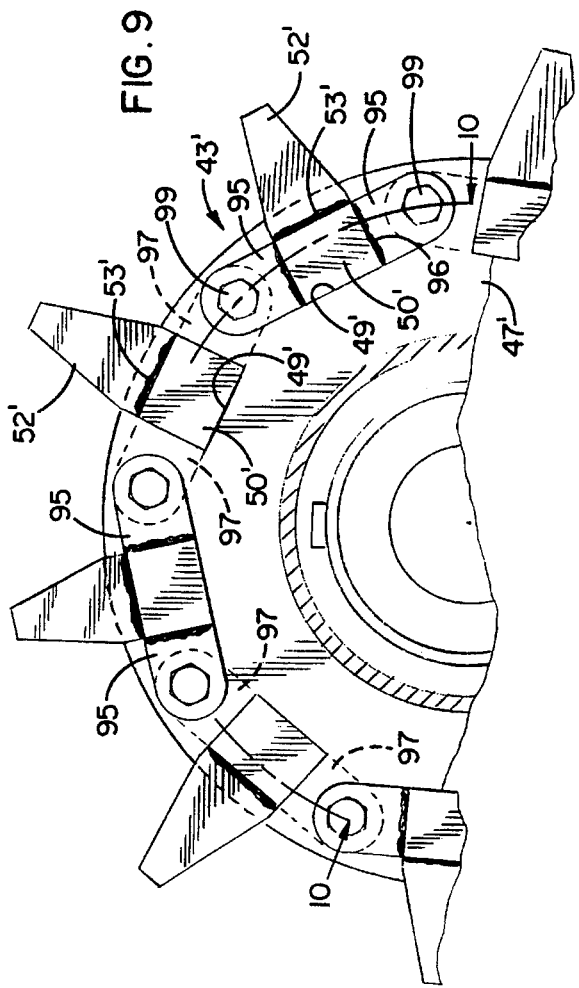
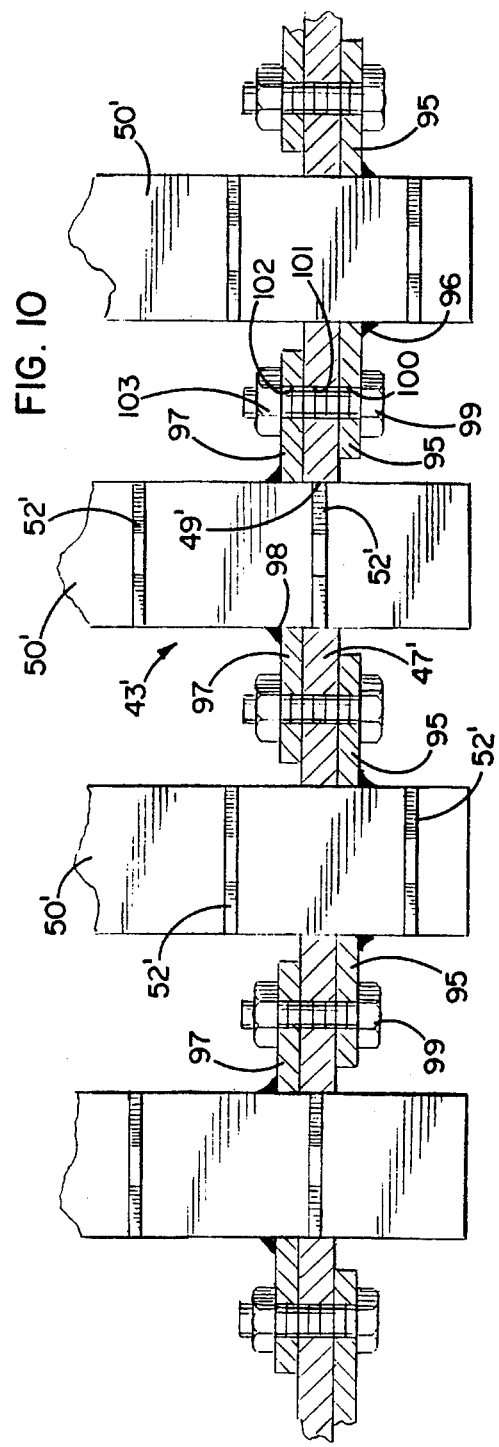

ROCK RAKING APPARATUS

BACKGROUND OF THE INVENTION

This invention relates generally to apparatus for raking up rocks from the ground and, more particularly, to apparatus adapted to be attached to a self-propelled vehicle and adapted to rake up the rocks as the vehicle travels over the ground.

Apparatus of this general type is disclosed in Baskett U.S. Pat. No. 5,060,732. In general, the apparatus comprises a raking unit having a toothed rotor supported to rotate about a laterally extending axis by two laterally spaced side walls. A bucket is pivotally connected to one end of the raking unit and collects the rocks raked up by the unit. The bucket also is pivotally connected to lift arms of the vehicle and, by actuating such arms, the raking unit and the bucket may be lifted from the ground to a transport position. After the raking unit has been moved to a dumping location, an actuator between the vehicle and the bucket is operated to cause the bucket to pivot to an open position relative to the raking unit and enable dumping of the rocks. In order to enable lifting of the raking unit and opening of the bucket, additional actuators are required between the raking unit and the bucket.

The rotor of the raking unit of the Baskett patent is in the form of a hollow drum. Laterally extending and angularly spaced channels are welded to the periphery of the drum and each carries a plurality of laterally spaced teeth. Small rocks and dirt tend to become trapped between the teeth and against the drum and are carried back around with the drum rather than being raked up.

Additional rock raking apparatus is disclosed in Baskett U.S. Pat. No. 4,113,023 and Erholm U.S. Pat. No. 4,364,434. Those devices, however, require extremely complex raking units in that the apparatus of the Baskett '023 patent utilizes multiple rotors while the apparatus of the Erholm patent utilizes endless chains to carry the raking teeth.

SUMMARY OF THE INVENTION

The general aim of the present invention is to provide new and improved rock raking apparatus which, when compared to other commercially available apparatus of the same general type, is of simpler and less expensive construction, is easier to operate, and is more rugged and durable.

A further object of the invention is to provide a raking apparatus in which the bucket may be opened relative to the raking unit simply by reversing the direction of rotation of the rotor and causing the rotor to coact with large rocks to force the bucket open.

Another object is to provide raking apparatus in which the raking unit is connected to the bucket in such a manner as to enable flexibility in maneuvering the bucket relative to the raking unit, to enable each side of the raking unit to float vertically through a limited range relative to the other side of the unit as the rotor passes over uneven ground and to the raking unit to float vertically through a limited range relative to the vehicle.

Still another object is to provide raking apparatus having a power-rotated brush for clearing the rotor of rocks and dirt which tend to carry around with the rotor.

The invention also resides in the provision of raking apparatus in which the bucket is equipped with a perforated bottom to enable excessive dirt and pebbles to escape from the bucket.

These and other objects and advantages of the invention will become more apparent from the following detailed description when taken in conjunction with the accompanying drawings.

BRIEF DESCRIPTION OF THE DRAWINGS

FIG. 5 is an enlarged view similar to FIG. 2 but shows the bucket in a closed position relative to the raking unit, certain parts being broken away for purposes of clarity.

FIG. 7 is a view of certain components shown in FIG. 5 with still other parts being broken away for purposes of clarity.

FIG. 7A is an enlarged fragmentary cross-section taken substantially along the line 7A—7A of FIG. 7.

FIG. 8 is an enlarged fragmentary end view of the rotor.

FIG. 9 is a view similar to FIG. 8 but shows a modified rotor.

FIG. 10 is an enlarged fragmentary cross-section taken substantially along the line 10—10 of FIG. 9.

Figure 1:
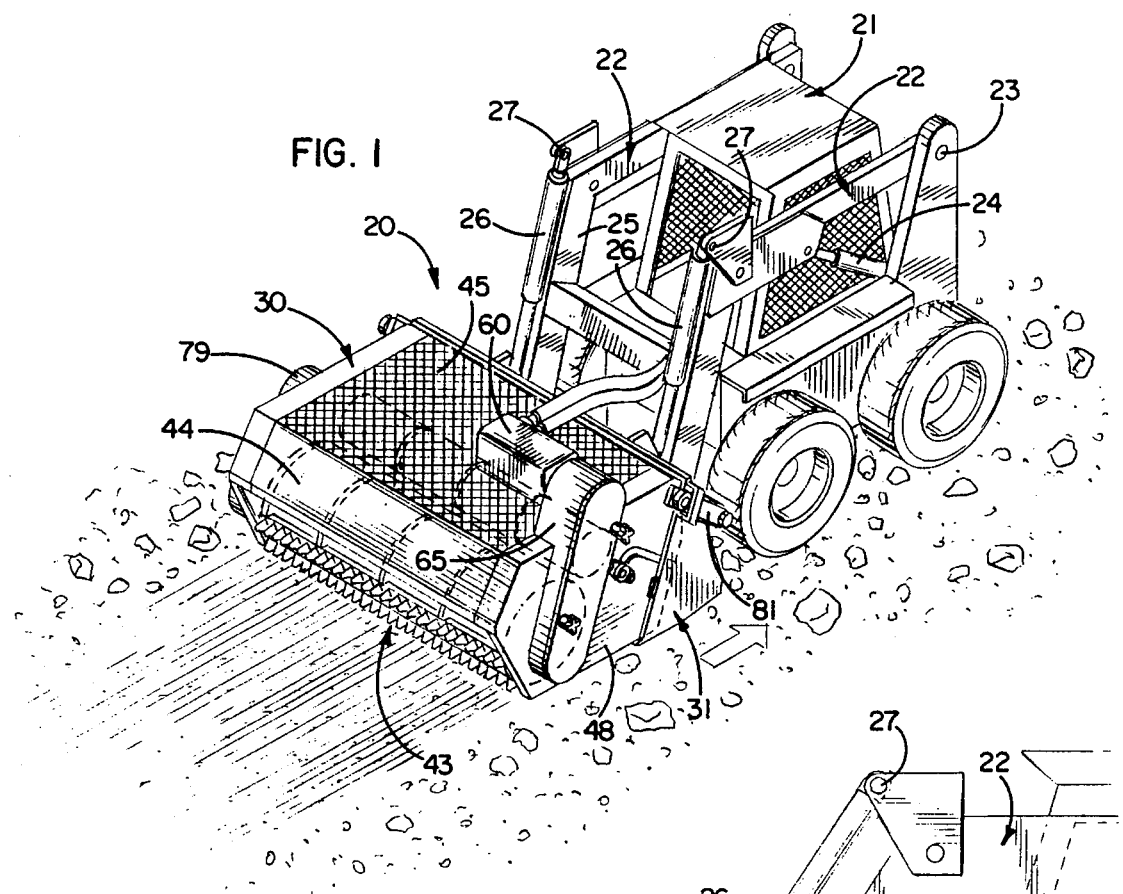
FIG. 1 is a perspective view of new and improved rock raking apparatus incorporating the unique features of the present invention and shows the apparatus attached to a typical vehicle.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

As shown in the drawings for purposes of illustration, the invention is shown as incorporated in apparatus 20 for raking up rocks from the ground. The apparatus may, for example, be used by a landscaper to clear rocks from a construction site and to smooth the ground.

The apparatus 20 is attached to a self-propelled vehicle 21 which, in this particular instance, is of the type conventionally known as a skid steer loader. The vehicle includes a pair of laterally spaced lift arms 22 which are pivotally supported at 23 near the rear of the vehicle to swing upwardly and downwardly under the control of two reciprocating hydraulic actuators 24, only one of the actuators being visible. Portions 25 of the arms extend downwardly in front of the vehicle. Located in front of and extending substantially parallel to the downwardly extending arm portions 25 are two additional reciprocating hydraulic actuators 26 whose purpose will be explained subsequently. The upper end portions of the actuators 26 are pivotally connected to the arms 22 as indicated at 27.

The raking apparatus 20 includes a raking unit 30 and a collecting bucket 31 located adjacent one end of the raking unit. As shown most clearly in FIG. 6, the bucket 31 includes a rear wall 32, two laterally spaced side walls 33, a bottom wall 34 and a laterally extending scraper blade 35 attached to the forward edge of the bottom wall. In this specific instance, laterally spaced mounting brackets 36 are attached to the rear side of the rear wall 32 and are pivotally connected at 37 (FIG. 2) to the lower ends of the downwardly extending arm portions 25 so as to support the bucket for pivoting about a laterally extending axis relative to the arms. Such pivoting is effected by the actuators 26, which are pivotally connected at their lower ends to the upper ends of the brackets 36 as indicated at 38.

Herein, the raking unit 30 comprises a pair of laterally spaced side walls 40 and 41 (FIG. 6) which are connected to the bucket 31 in a manner to be explained subsequently, the connection between the side walls and the bucket permitting the bucket to be moved between a closed position (FIG. 5) and an open position (FIG. 2) relative to the raking unit. A toothed rotor 43 extends laterally between and is supported for rotation by the side walls. During normal operation, the raking unit 30 and the bucket 31 are pulled rearwardly by the vehicle 21, the rotor 43 is rotated in a counterclockwise direction (FIGS. 2 and 5) and, as an incident thereto, the rotor rakes rocks from the ground and propels the rocks into the bucket while the bucket is in a closed position relative to the raking unit. A shield 44 (FIGS. 1 and 6) extends between the upper forward end portions of the side walls to add stiffness to the side walls and also to guard against rocks being thrown forwardly. In addition, a heavy screen or grate 45 such as expanded metal spans the upper ends of the side walls to further connect the side walls and to enable the operator to see the rotor during operation of the raking unit.

In accordance with one aspect of the invention, the toothed rotor 43 is constructed so as to minimize carry-over of rocks and dirt to the front of the rotor. For this purpose, the rotor includes several (e.g., five) laterally spaced and radially extending discs 47. As shown most clearly in FIG. 8, the outer periphery of each disc is formed with a plurality of angularly spaced notches 49. Herein, each disc includes ten such notches, and each notch is generally square in shape. Square bars 50 are seated in the notches and extend laterally of the discs with the ends of the bars projecting outwardly a short distance from the outboard sides of the outboard discs. Each bar is secured rigidly to each disc by a weld 51 which preferably extends around the three margins of the associated notch 49. Generally trapezoidal-shaped raking teeth 52 are spaced laterally along each bar and are attached thereto by welds 53.

By virtue of the notched discs 47, assembly of the toothed bars 50 to the discs may be achieved in a relatively quick and easy manner. The notches automatically locate the bars in proper angular positions relative to the discs and thus welding of the bars to the discs may be achieved without need of complex fixtures. Moreover, by fabricating the rotor 43 from laterally spaced discs 47 spanned by laterally extending bars 50, rocks and dirt which tend to move around with the rotor drop between the bars and discs and are not carried around and thrown forwardly from the front of the rotor.

The rotor 43 is rotatably supported by two stub shafts 46 and 46A which are connected to the two outboard discs 47. The stub shafts project outwardly beyond the outboard sides of the side plates 40 and 41 and are journaled by bearings 55 (FIG. 6) supported by subplates 56 which, in turn, are bolted to the inboard sides of the plates 40 and 41. To facilitate assembly of the rotor 43 with the side plates 40 and 41, such plates are formed with vertically elongated slots 57 which open downwardly out of the lower edges of the plates. Thus, the rotor may be installed by lifting the rotor upwardly to locate the stub shafts in the slots and by then bolting the plates 56 to the plates 40 and 41.

Driving of the rotor 43 is effected by a reversible motor 60 (FIGS. 1 and 6) which herein is a hydraulic rotor powered by the hydraulic system of the vehicle. The motor is supported on the grate 45 and includes an output shaft 61 (FIG. 6) to which is secured a sprocket 62. A chain 63 is trained around the sprocket and also around a sprocket 64 secured to the stub shaft 46. The stub shaft 46 is a precision splined shaft to establish a rugged torque coupling with the drive sprocket 64. The chain is shielded by a guard 65 on the side plate 40 and by a cover 66 adapted to be releasably secured to the guard by fasteners 67. A lower end section 68 of the guard is releasably attached to the main body of the guard to enable the sprocket 64 to move upwardly into the main body of the guard when the stub shaft 46 is lifted upwardly into the slot 57.

As stated above, the rotor 43 normally is rotated in a counterclockwise direction to rake rocks rearwardly toward the bucket 31. Inherently, some rocks and packed dirt tend to carry over between adjacent teeth 52 on a bar 50 or between the teeth of adjacent bars. Pursuant to the invention, the raking unit is provided with a power-rotated brush 70 which sweeps such rocks and packed dirt from the teeth and behind the rotor so that the teeth remain effective to rake up rocks when the teeth next pass over the ground.

While different types of brushes may be used, the present brush 70 includes a central shaft 71 (FIG. 6) which carries a series of disc-like brush segments 72 each having stiff bristles. The segments are located closely adjacent one another and are positioned axially such that one segment is located between axially adjacent teeth 52. The brush is positioned above and to the rear of the rotor 43 and, when viewed from the outboard side of the side plate 40, is located at about a one o'clock position relative to the rotor.

Figure 6:
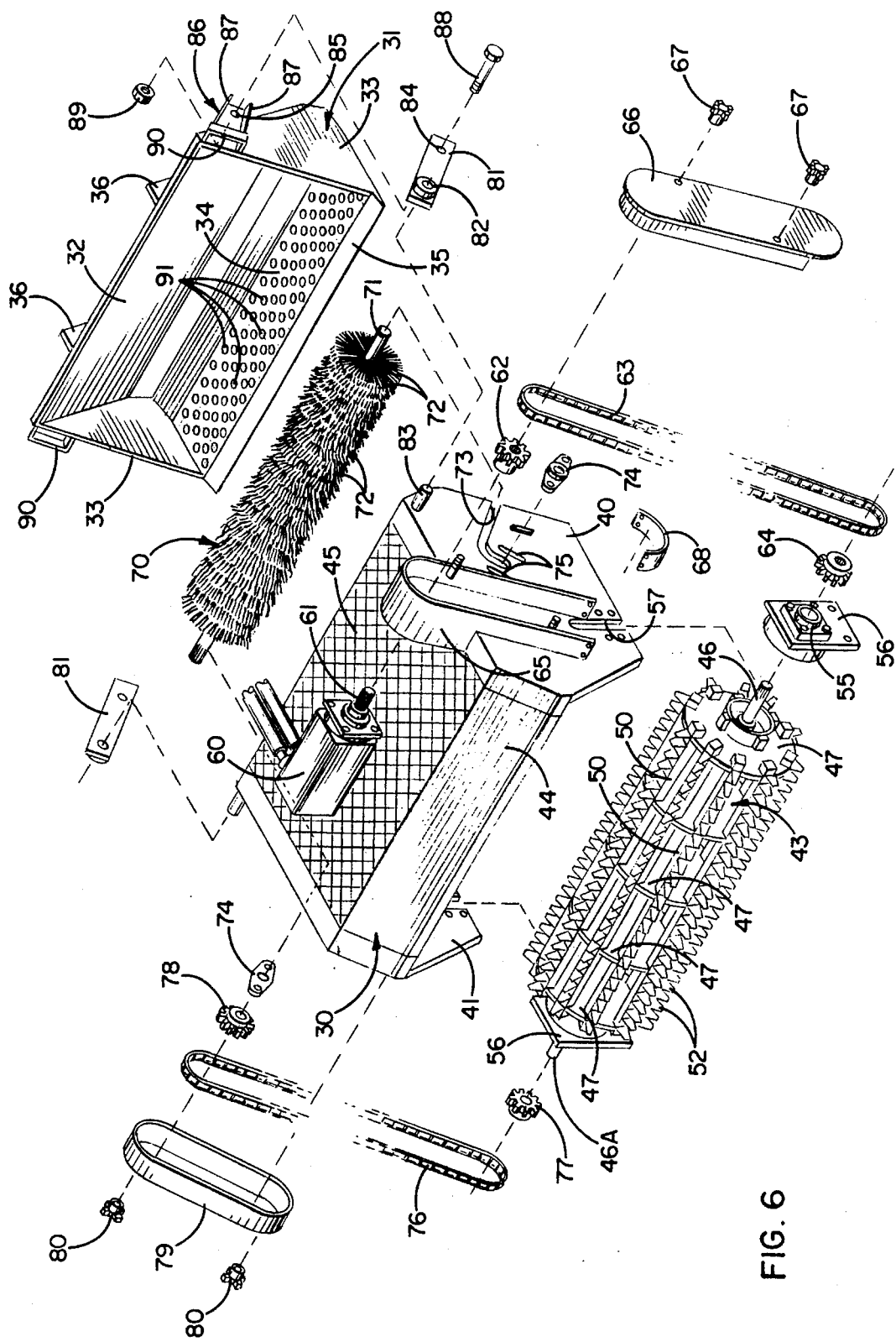
FIG. 6 is an exploded perspective view of the raking apparatus.

The brush 70 is mounted so as to be capable of being easily installed and removed and of being easily adjusted toward the rotor 43 to compensate for wear. To this end, the side plates 40 and 41 are formed with generally L-shaped slots 73 (FIG. 6). The long leg of each slot is inclined downwardly and rearwardly and opens out of the rear edge of the respective side plate while the short leg of each slot is angled downwardly and forwardly. As a result, the end portions of the shaft 71 may be moved radially into the slots from the rear edges of the side plates. The shaft end portions are journaled by bearings 74 carried by plates 74A (FIG. 7A) which are secured to the inboard sides of the side plates by bolts 79B fitting through elongated slots 75 located on opposite sides of and extending generally parallel to the short legs of the slots 73. By loosening the bolts, the shaft may be shifted downwardly in the short legs of the L-shaped slots 75 in order to move the brush 70 closer to the rotor 43 when the bristles of the brush wear.

Advantageously, the brush 70 is rotated in the same direction as the rotor 43 so that rocks cleared from the rotor by the brush normally are thrown downwardly and rearwardly toward the bucket 31. Rotation of the brush is achieved in a simple manner by means of a chain 76 (FIG. 6) located adjacent the outboard side of the side plate 41 and trained around sprockets 77 and 78 on the stub shaft 46A and the shaft 71, respectively. Thus, rotation of the rotor 43 is transmitted to the brush 70 by the chain 76 so as to rotate the brush in the same direction as the rotor. The chain is shielded by a guard 79 which is releasably secured to the side plate 41 by fasteners 80. The plates 56 and 74A close the slots 57 and 73, respectively, to prevent dirt and dust from flying outboard through the slots and fouling the chains 63 and 76.

The stub shaft 46A is a simple keyed shaft for coupling to the sprocket 77. When the leading edges of the teeth 52 wear, the stub shafts 46 and 46A may be removed, the rotor may be turned end-for-end and then the stub shafts may be re-installed. This enables the rotor to be used until the opposite edges of the teeth become worn.

Further in accordance with the invention, the raking unit 30 is connected to the bucket 31 in such a manner as to enable either side of the raking unit to float vertically relative to the other side through a limited range or to float vertically relative to the vehicle 21 in the event the rotor 43 encounters laterally uneven terrain, in the event one of the side plates 40 or 41 rides over a relatively large rock, or in the event either the raking unit or the vehicle falls into a valley or encounters a ridge. For this purpose, the raking unit 30 is connected to the buckets 31 by pivot members 81 (FIG. 6) which are pivotally connected both to the raking unit and to the bucket. The pivot members are essentially identical and thus only the pivot member adjacent the side wall 40 will be described in detail. That pivot member herein is in the form of a flat elongated bar whose forward end portion carries a bushing 82 that is pivotally received on a pin 83 projecting laterally outwardly from the side plate 40 near the extreme upper rear corner thereof. The rear end portion of the bar 81 is formed with a hole 84 which is aligned with a hole 85 formed in the web of a channel 86 having upper and lower flanges 87 and welded to the extreme upper end of the outboard side of side wall 33 of the bucket 31. A bolt 88 extends through the holes 84 and 85 and pivotally attaches the rear end portion of the bar 81 to the channel 86, the bolt being secured by a nut 89. The channel is inclined in an upward and forward direction, and the vertical spacing between the flanges 87 gradually increases as the channel proceeds forwardly. A strap 90 is welded to the front of the channel 86 to reinforce the channel against deflection.

By virtue of the bars 81 being attached to the raking unit 30 and the bucket 31 by the double pivots 83 and 88, respectively, either side of the raking unit is free to float vertically relative to the other side to accommodate laterally uneven terrain. Also, the raking unit may float vertically relative to the vehicle. The bars engage the flanges 87 of the channels 86 to limit the extent of such floating and to prevent excessive relative pivoting of the raking unit and the bucket. In addition, the pivoted bars enable the bucket 31 to be pivoted to an open position relative to the raking unit 30 when the arms 22 are swung upwardly and the actuators 26 are extended (see FIG. 2).

In operation of the apparatus 20, the bucket 31 is normally closed relative to the raking unit 30 as shown in FIGS. 1 and 5 and, when the bucket is closed, the forward end portions of its side walls 30 overlap the outboard sides of the rear end portions of the side walls 40 and 41 of the raking unit while the blade 35 of the bucket is located just rearwardly of the rotor 43. As the vehicle 21 moves rearwardly and as the rotor is rotated counterclockwise, rocks are raked up by the teeth 52 and are swept into the bucket. Advantageously, the bottom wall 34 of the bucket is perforated with several holes 91 (FIG. 6) to allow dirt and small pebbles to fall from the bucket and thereby increase the capacity of the bucket for large rocks.

Figure 2:
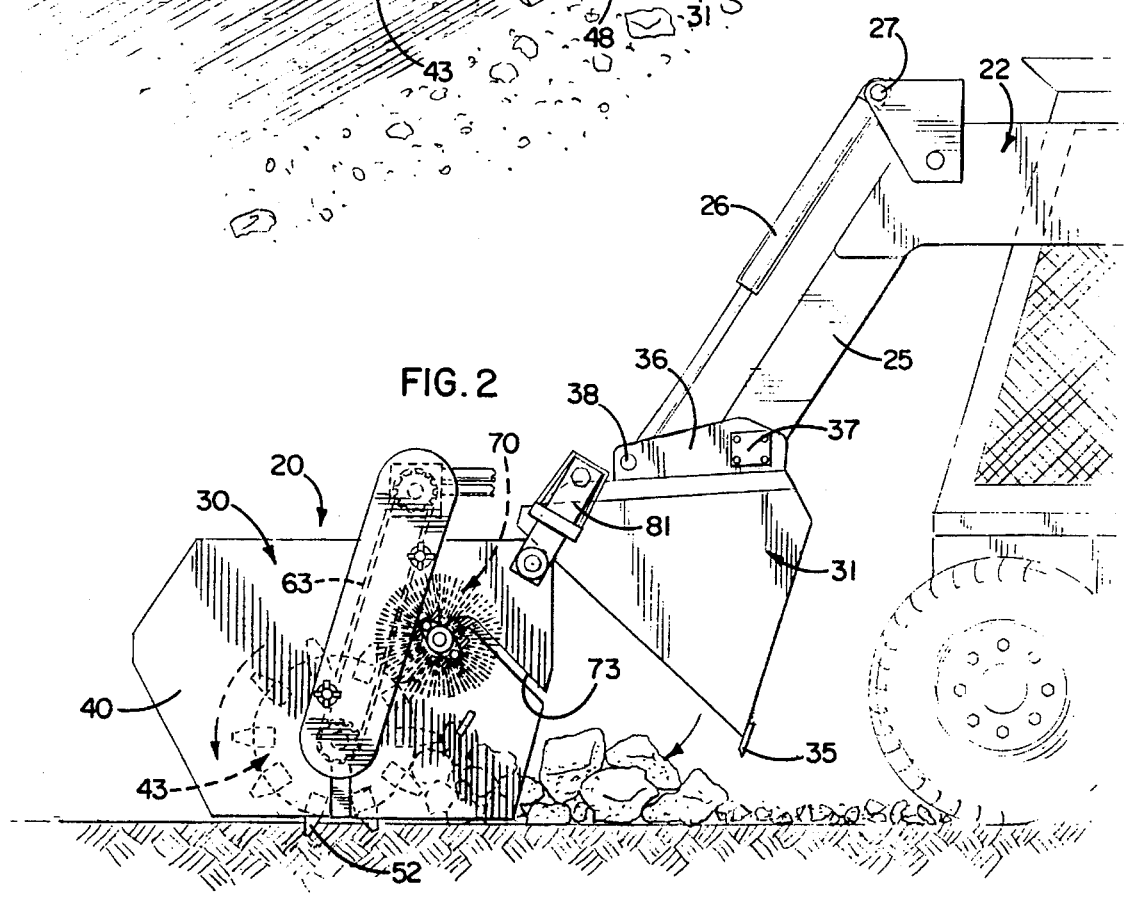
FIG. 2 is a side view of the apparatus and shows the collecting bucket in an open position during travel of the raking unit along the ground.

In some cases, the rocks behind the bucket 31 may be too large for the bucket to clear as the vehicle 21 moves rearwardly. In such an instance, the bucket may be opened relative to the raking unit 30 as shown in FIG. 2 by raising the arms 22 with the actuators 24 and by simultaneously swinging the bucket about the pivots 37 with the actuators 26, such pivoting being permitted by the double-articulated bars 81. After the bucket has moved rearwardly past the large rocks, it may be swung reversely to its closed position and, as an incident thereto, the blade 35 scrapes the large rocks into the bucket or acts in conjunction with the rotor 43 to load the rocks into the bucket. Alternatively, the bucket may be left open and the rotor used to rake the rocks into a windrow as the vehicle travels rearwardly.

Figure 3:
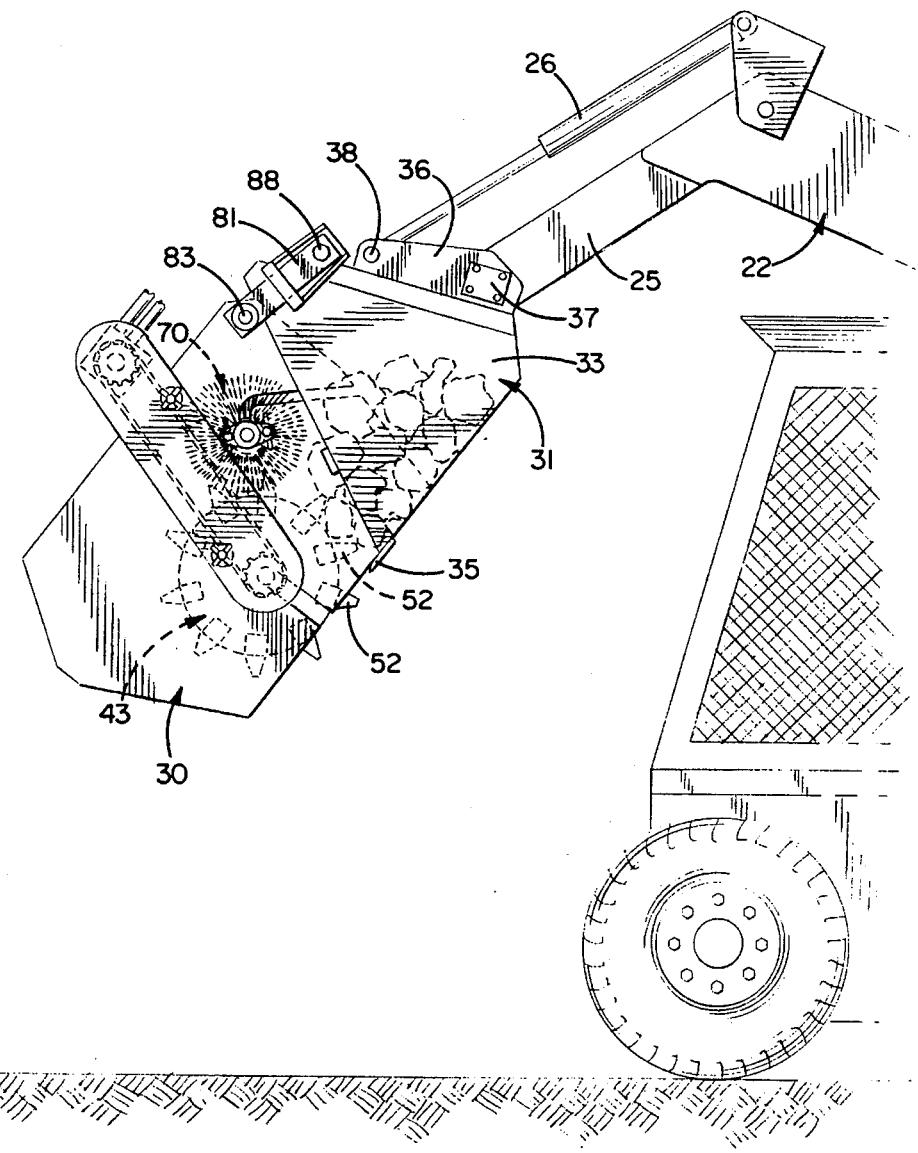
FIG. 3 is a side view showing the apparatus lifted to a position preparatory to dumping the rocks from the bucket.
Figure 4:
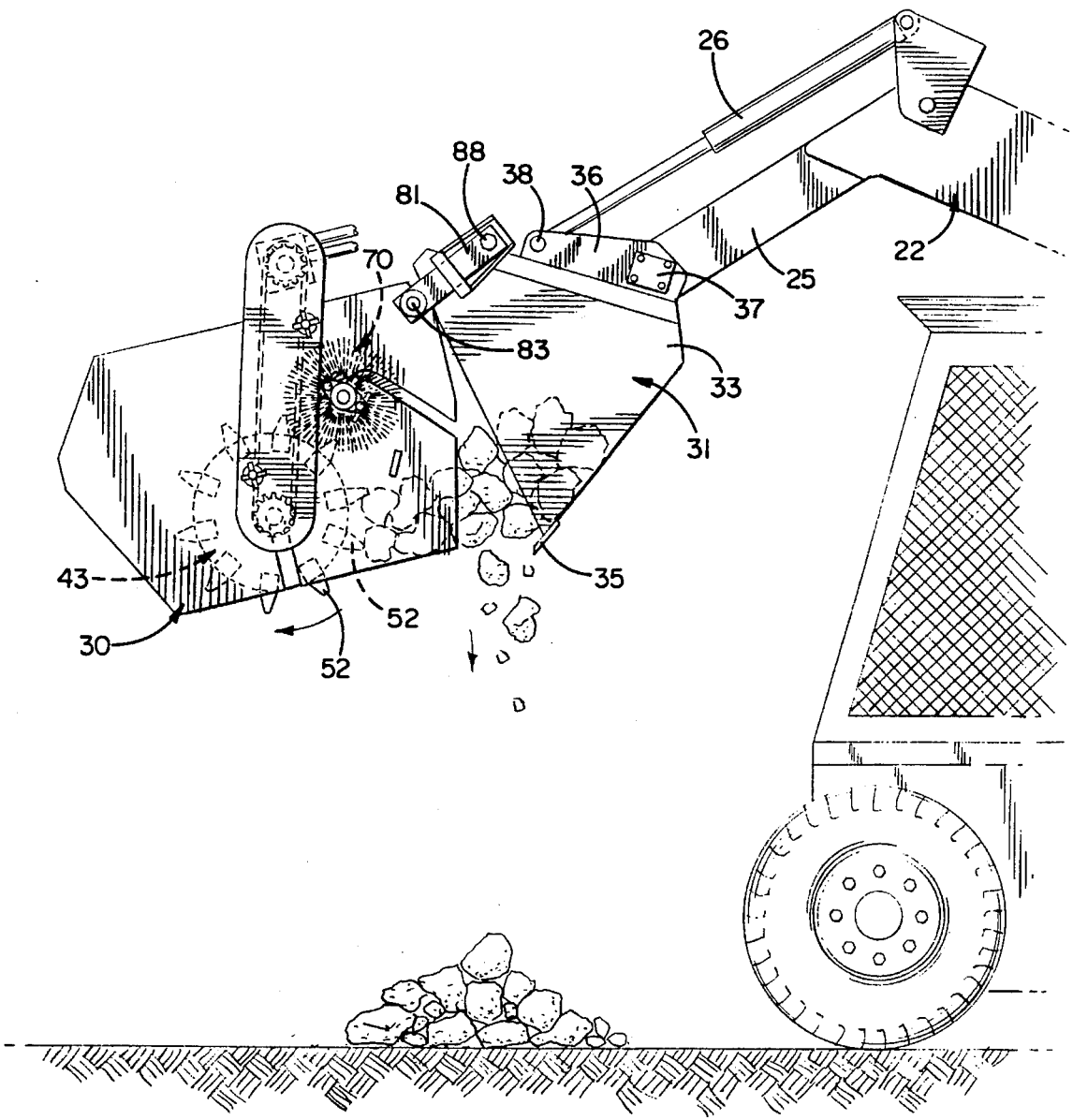
FIG. 4 is a view similar to FIG. 3 but shows the bucket in an open position relative to the raking unit and dumping rocks from the bucket.

After the bucket 31 has been loaded, the bucket and the raking unit 30 may be lifted as a unit to a transport position (not shown) by swinging the arms 22 slightly upwardly with the actuators 24 and by simultaneously retracting the actuators 26. The rotor 43 is stopped as the components are lifted and transported to a site where the rocks are to be dumped. At that site, the arms 22 are further raised and the actuators 26 are extended to move the raking unit to a dump position (FIG. 3). Thereafter, the rotor is rotated reversely (i.e., clockwise as viewed in FIG. 4). Such rotation causes the rocks to wedge between the teeth 52 and the bucket 31 and, as a result, the raking unit 30 is forced clockwise about the pivot 83 as shown in FIG. 4 to open the raking unit relative to the bucket and to allow the rocks to fall to the ground. Accordingly, the pivot bars 81 with the double pivots 83 and 88 at the raking unit 30 and the bucket 31, respectively, enable clockwise swinging and opening of the raking unit relative to the bucket when the rotor is reversed. Thus, there is no need for hydraulic or mechanical dumping actuators between the raking unit and the bucket.

FIGS. 9 and 10 show a modified rotor 43' in which parts corresponding to those of the rotor 43 of the first embodiment are indicated by the same but primed reference numerals. The rotor 43' is characterized particularly in that the bars 50' may be easily removed and replaced in the event the bar or one or more teeth 52' on the bar becomes damaged.

Specifically, the teeth 52' are welded to the outer sides of the bars 50' as before as indicated at 53'. And, as before, the bars 50' are seated in notches 49' opening out of the outer peripheries of the discs 47'. Instead of being welded to each disc, however, the bars are bolted to the disc so that the bars may be removed and replaced. Moreover, bolting of the bars to the disc is achieved in a simple and economical manner.

Referring to FIGS. 9 and 10, mounting lugs 95 are welded at 96 to every other angularly spaced bar 50' and project chordwise in opposite directions from the bar. The lugs 95 are located adjacent one side of the mounting disc 47'. Similarly extending mounting lugs 97 are similarly welded at 98 to the intervening bars 50' but are located adjacent the opposite side of the mounting disc. To fasten the lugs 95 and 97 to the disc, a bolt 99 extends through a hole 100 (FIG. 10) in the mounting lug 95 of one of the bars 50', then extends through a hole 101 in the disc 47' and then extends through a hole 102 in the mounting lug 97 of an adjacent bar; the bolt being secured by a nut 103. In this way, two bars may be secured to the disc through the use of only three bolts and, in addition, the positioning of lugs 95 and 97 on opposite sides of the disc reinforces the periphery of the disc against lateral deflection. Any given bar may be removed for replacement or repair simply by releasing the bolts extending through the lugs of the bar.

We claim:

1. Apparatus adapted to be attached to a self-propelled vehicle and operable to rake up rocks from the ground as the vehicle moves along the ground, said apparatus comprising a raking unit having first and second ends and having a pair of laterally spaced side walls, a toothed rotor supported by said side walls to rotate about a first laterally extending axis, a selectively reversible motor for rotating said rotor in either direction about said axis, said rotor normally being rotated in a first direction to rake rocks along the ground toward the vehicle and toward the first end of said raking unit when said vehicle is moved in a direction such that said first end of said raking unit is disposed in leading relation to said second end, a bucket movable with said raking unit and normally closing the first end thereof whereby rocks raked along the ground by said rotor are propelled into said bucket, means on said vehicle for lifting said raking unit and said bucket off of the ground to a raised position, and means connecting said bucket pivotally to said raking unit, the connecting means including at least one pivot allowing free pivotable movement of the raking unit with respect to the bucket, the pivot being positioned so that when the bucket is raised:

(1) the raking unit is suspended in a normally closed condition with respect to said bucket; and (2) upon rotation of the rotor in a second direction, opening forces are created by the rotor engaging the rocks to pivot the raking unit open relative to said bucket to dump said rocks.

2. Apparatus as defined in claim 1 in which said connecting means comprise laterally extending pivots between said bucket and said side walls, said pivots being located at the upper end portions of said side walls at the first end of said raking unit.

3. Apparatus as defined in claim 2 in which each pivot includes a bar having one end connected at a first pivot point to the respective side wall and having an opposite end connected at a second pivot point to said bucket whereby said side walls may float vertically relative to one another as said raking unit moves along the ground.

4. Apparatus as defined in claim 3 further including means on said bucket for restricting upward and downward pivoting of said bars to a predetermined range thereby to limit relative vertical floating of said side walls.

5. Apparatus as defined in claim 1 further including a brush supported by said side walls to rotate about a second axis paralleling said first axis, means for rotating said brush in the same direction as said rotor, said brush engaging said rotor to clear the rotor of rocks carried around by the rotor.

6. Apparatus as defined in claim 1 in which said bucket includes a bottom wall, said bottom wall being perforated to allow dirt and pebbles to drop out of said bucket through said bottom wall.

7. Apparatus adapted to be attached to a self-propelled vehicle and operable to rake up rocks from the ground as the vehicle moves along the ground, said apparatus comprising a raking unit having first and second ends and having a pair of laterally spaced side walls, a toothed rotor supported by said side walls to rotate about a first laterally extending axis, a selectively reversible motor for rotating said rotor in either direction about said axis, said rotor normally being rotated in a first direction to rake rocks along the ground toward the vehicle and toward the first end of said raking unit when said vehicle is moved in a direction such that said first end of said raking unit is disposed in leading relation to said second end, a bucket movable with said raking unit and normally closing the first end thereof whereby rocks raked along the ground by said rotor are propelled into said bucket, means on said vehicle for lifting said raking unit and said bucket off of the ground to a raised position, and means connecting said bucket pivotally to said raking unit and normally causing said raking unit to be in closed relation with said bucket when said raking unit and said bucket are in said raised position, said connecting means permitting said raking unit to open relative to said bucket when said raking unit and said bucket are in said raised position and when said rotor is rotated in a second direction to cause rocks to create an opening force between said raking unit and said bucket, in which said rotor comprises a plurality of laterally spaced discs, angularly spaced bars extending laterally between and secured to said discs, and generally radially extending teeth spaced along and attached to each of said bars.

8. Apparatus as defined in claim 7 in which each disc includes a peripheral edge portion with a plurality of angularly spaced notches, said bars being located in said notches.

9. Apparatus as defined in claim 8 in which each of said bars is welded to said discs in the vicinity of said notches.

10. Apparatus as defined in claim 7 further including mounting lugs attached to and extending in opposite directions from each bar, the mounting lugs of every other bar being located on one side of said discs, the mounting lugs of intervening bars being located on the opposite side of said discs, and threaded fasteners for securing said mounting lugs to said discs, each fastener extending through the mounting lug of a bar, then extending through said disc and then extending through the mounting lug of an adjacent bar whereby each fastener secures two lugs to said disc.

11. Apparatus adapted to be attached to a self-propelled vehicle and operable to rake up rocks from the ground as the vehicle moves along the ground, said apparatus comprising a raking unit having first and second ends and having a pair of laterally spaced side walls, a rotor supported by said side walls to rotate about a first laterally extending axis, said rotor having an outer periphery from which extend a plurality of angularly spaced rows of laterally spaced and generally radially extending teeth, a selectively reversible motor for rotating said rotor in either direction about said axis, said rotor normally being rotated in a first direction to rake rocks along the ground toward the vehicle and toward the first end of said raking unit when said vehicle is moved in a direction such that said first end of said raking unit is disposed in leading relation to said second end, a bucket movable with said raking unit and normally closing the first end thereof whereby rocks raked along the ground by said rotor are propelled into said bucket, and a brush supported by said side walls for rotation about an axis paralleling the axis of the rotor, said brush being located adjacent the first end of said raking unit and engaging said rotor at about a one o'clock position when said brush and said rotor are viewed from the outboard side of one of said side walls, the brush having bristles which extend past the teeth to contact the rotor periphery and being positioned and rotated to throw rocks from the rotor in said first direction into the bucket.

12. Apparatus as defined in claim 11 in which said brush includes mounting shaft means and means for attaching said mounting shaft means to said side walls and for permitting selective adjustment of said brush toward said rotor to compensate for wear of said bristles.

13. Apparatus as defined in claim 12 in which said side walls include means for enabling installation and removal of said brush with respect to said side walls by moving said brush radially.

14. Apparatus as defined in claim 11 including means for rotating said brush in the same direction as said rotor whereby said brush clears said rocks from said teeth as said teeth rotate past said brush in which said means for rotating said brush are driven by said rotor.

15. Apparatus adapted to be attached to a self-propelled vehicle and operable to rake up rocks from the ground as the vehicle moves along the ground, said apparatus comprising a raking unit having first and second ends and having a pair of laterally spaced side walls, a toothed rotor supported by said side walls to rotate about a first laterally extending axis, a motor for rotating said rotor in a direction to cause said rotor to rake rocks along the ground toward the vehicle and toward the first end of said raking unit when said vehicle is moved in a direction such that said first end of said raking unit is disposed in leading relation to said second end, a bucket normally closing the first end thereof whereby rocks raked along the ground by said rotor are propelled into said bucket, first means for pivotally attaching said bucket to said vehicle, and second means for pivotally attaching said bucket to said raking unit, said second means comprising laterally extending pivots between said bucket and said side walls, said pivots being located at the upper end portions of said side walls adjacent the first end of said raking unit, each pivot including a bar having one end pivotally connected to the respective side wall and having an opposite end pivotally connected to said bucket whereby said side walls may float vertically relative to one another and relative to said bucket as said raking unit moves along the ground.

16. Apparatus adapted to be attached to a self-propelled vehicle and operable to rake up rocks from the ground as the vehicle moves along the ground, said apparatus comprising a raking unit having first and second ends and having a pair of laterally spaced side walls, a rotor supported by said side walls to rotate about a first laterally extending axis, a selectively reversible motor for rotating said rotor in either direction about said axis, said rotor normally being rotated in a first direction to rake rocks along the ground toward the vehicle and toward the first end of said raking unit when said vehicle is moved in a direction such that said first end of said raking unit is disposed in leading relation to said second end, a bucket movable with said raking unit and normally closing the first end thereof whereby rocks raked along the ground by said rotor are propelled into said bucket, said rotor comprising a plurality of laterally spaced discs, angularly spaced bars extending laterally between and secured to said discs, and generally radially extending teeth spaced along and attached to each of said bars.

* * * * *

UNITED STATES PATENT AND TRADEMARK OFFICE
CERTIFICATE OF CORRECTION

PATENT NO.  : 5,564,506
DATED       : October 15, 1996
INVENTOR(S) : Philip W. Foster It is certified that error appears in the above-indentified patent and that said Letters Patent is hereby corrected as shown below:

Title page, item [73], Assignee: delete "Rockford" and insert-- "Lee"--

Signed and Sealed this

Eighteenth Day of February, 1997

Attest:

BRUCE LEHMAN

*Attesting Officer*     *Commissioner of Patents and Trademarks*